(12) United States Patent
Guilloux et al.

(10) Patent No.: US 8,646,909 B2
(45) Date of Patent: Feb. 11, 2014

(54) METHOD FOR DETERMINING, OPTIMIZING AND PRODUCING AN OPHTHALMIC LENS AND SET OF OPHTHALMIC LENSES

(75) Inventors: Cyril Guilloux, Charenton le Pont (FR); Soazic Mousset, Charenton le Pont (FR); Isabelle Poulain, Charenton le Pont (FR)

(73) Assignee: Essilor International (Compagnie Generale d'Optique), Charenton-le Pont (FR)

( * ) Notice: Subject to any disclaimer, the term of this patent is extended or adjusted under 35 U.S.C. 154(b) by 0 days.

(21) Appl. No.: 13/499,553

(22) PCT Filed: Sep. 29, 2010

(86) PCT No.: PCT/IB2010/054392
§ 371 (c)(1),
(2), (4) Date: Mar. 30, 2012

(87) PCT Pub. No.: WO2011/039712
PCT Pub. Date: Apr. 7, 2011

(65) Prior Publication Data
US 2012/0268713 A1    Oct. 25, 2012

(30) Foreign Application Priority Data

Oct. 1, 2009   (FR) ...................................... 09 04681

(51) Int. Cl.
*G02C 7/02* (2006.01)
(52) U.S. Cl.
USPC ................................. 351/159.77; 351/159.73
(58) Field of Classification Search
USPC .......................... 351/159.41, 159.42, 159.73, 351/159.75–159.77
See application file for complete search history.

(56) References Cited

U.S. PATENT DOCUMENTS

| | | | |
|---|---|---|---|
| 7,887,183 B2* | 2/2011 | Drobe et al. | ................ 351/159.8 |
| 2003/0107707 A1* | 6/2003 | Fisher et al. | ................... 351/177 |

(Continued)

FOREIGN PATENT DOCUMENTS

| | | |
|---|---|---|
| EP | 0990939 A1 | 4/2000 |
| EP | 1747750 A1 | 1/2007 |

OTHER PUBLICATIONS

"Ihre Brille auf Sie angepasst" Feb. 14, 2008, retrieved from the Internet: URL: http://www.zeiss.de/netfraldemo_brillenanpassunq, 5 pages.

(Continued)

*Primary Examiner* — Ricky Mack
*Assistant Examiner* — William Alexander
(74) *Attorney, Agent, or Firm* — Polsinelli PC

(57) ABSTRACT

The invention relates to a method for determining an ophthalmic lens for a person ($i_1$, $i_2$, $i_3$) to wear said lens, comprising the following steps: i) determination of the size ($T_1$, $T_2$, $T_3$) or height of the eyes ($H_1$, $H_2$, $H_3$) of the person to wear the lens; and ii) calculation of at least one characteristic of the ophthalmic lens according to the size ($T_1$, $T_2$, $T_3$) or the height of the eyes ($H_1$, $H_2$, $H_3$) of the person to wear the lens. The ophthalmic lens can be progressive strength or unifocal. The invention also relates to an optimization method and a method for producing an ophthalmic lens implementing such a definition method. The invention further relates to a set of lenses having at least one characteristic that depends on the size and the height of the eyes of the person to wear the lens.

18 Claims, 5 Drawing Sheets

(56) References Cited

U.S. PATENT DOCUMENTS

2007/0229761 A1* 10/2007 Gimenez Carol et al. .... 351/209
2008/0094571 A1* 4/2008 Tarrant ......................... 351/169
2011/0128496 A1* 6/2011 Giraudet ....................... 351/204

OTHER PUBLICATIONS

International Preliminary Report on Patentability with English translation of Written Opinion, PCT/IB2010/054392, dated Jun. 4, 2013, 9 pages.

* cited by examiner

METHOD FOR DETERMINING, OPTIMIZING AND PRODUCING AN OPHTHALMIC LENS AND SET OF OPHTHALMIC LENSES

The present invention relates to a method for determining an ophthalmic lens, a method for optimizing and a method for the manufacture of ophthalmic lenses and to a set of ophthalmic lenses.

Any ophthalmic lens intended to be held in a frame, is associated with a prescription. The ophthalmic prescription may include a power prescription, positive or negative, and an astigmatism prescription. These prescriptions correspond to corrections applicable to the wearer of the lenses to correct vision defects. A lens is fitted in the frame in accordance with the prescription and the position of the wearer's eyes relative to the frame.

For presbyopic wearers, the value of the power correction is different for distance vision and near vision, due to the difficulties of accommodation for near vision. The prescription thus comprises a power value for distance vision and an addition (or power progression) representing the power increment between distance vision and near vision. This amounts to a power prescription for distance vision and a power prescription for near vision. Lenses suitable for presbyopic wearers are progressive multifocal lenses. These lenses are for example discussed in FR-A-2699294, U.S. Pat. No. 5,270, 745, U.S. Pat. No. 5,272,495, FR-A-2683642, FR-A-2 699 294 or FR-A-2704327.

Progressive multifocal ophthalmic lenses thus include a distance vision region, a near vision region, an intermediate vision region and a main meridian of progression passing through said three regions. They are generally determined by optimization from a number of constraints imposed on the various characteristics of the lens. Families of progressive multifocal lenses are defined, each lens of a family being characterized by an addition, which corresponds to the power variation between the distance vision region and the near vision region. Specifically, the addition, referred to as Add, is the change of power between a point VL in the distance vision region and a point VP in the near vision region, which are respectively called the distance vision control point and the near vision control point. Points VP and VL may correspond in particular to points on the lens where the power is the prescription for near vision and distance vision, respectively. Nevertheless, other definitions of these control points are also possible. The definition of these control points can in particular vary depending on the manufacturer of the ophthalmic lenses.

A lens has also traditionally a fitting cross CM. This is a point on the lens which is used by the optician for mounting the lens in the frame.

In particular, the optician, starting out from the anthropometric characteristics of the wearer—inter-pupil distances and heights of the pupils relative to the frame—proceeds with the machining of the lens edging, using the fitting cross as a reference. The latter corresponds, for a lens properly positioned in a frame, to the horizontal direction of gaze. In other words, for a lens properly positioned in a frame, the fitting cross corresponds to the point of intersection of the front face of the lens, directed away from the wearer with the primary direction of gaze of the wearer.

For a progressive ophthalmic lens, we can also define a lateral offset in the direction of the nose between the point VP in the near vision region and the point VL in the region for distance vision. This lateral offset towards the nose is called in English the inset. It is also possible to define the inset as being the lateral offset between the fitting cross of the ophthalmic lens and the hear vision control point VP. This definition of inset generally does not change the value of the inset. Indeed, the distance vision control point VL is generally vertically aligned with the fitting cross.

Progressive multifocal lenses usually have a complex aspherical face, which can be the front face directed away from the spectacle wearer, and a spherical or toric face, which can be the back surface directed towards the wearer of glasses. This spherical or toric face makes it possible to adapt the lens to the wearer's ametropia, so that a progressive multifocal lens is generally only defined by its complex aspherical surface. As is well known, an aspherical surface is usually defined by the altitude of every point thereon. Use is also made of parameters established by the minimum and maximum curvatures at each point, or more commonly the half-sum and difference thereof. This half-sum and the absolute value of the difference multiplied by a factor n−1, n being the refractive index of the material of the lens, are called mean sphere and cylinder.

A progressive multifocal lens can thus be defined at any point on its complex surface, by surface characteristics comprising a value of mean sphere and a value of cylinder. The complex surface of the lens can be located on the front or the rear face or distributed between both faces, depending on the machining techniques used.

Additionally, a progressive multifocal lens can also be defined by optical characteristics taking into account the situation of the wearer of the lenses. Indeed, the laws of optics for ray tracing result in the emergence of optical defects when the rays deviate from the centerline of any lens. We consider, conventionally, aberrations known as power and astigmatism defects. These optical aberrations can be generically called obliquity defects of rays. Obliquity defects of rays have been well identified in the prior art and improvements have been proposed.

For example, WO-A-98 12590 discloses a method for determination by optimization of a set of progressive multifocal ophthalmic lenses. This document proposes to define the set of lenses by considering the optical characteristics of the lenses notably the wearer power and oblique astigmatism in wearing conditions. The lens is optimized by ray tracing, from a so-called ergorama associating a target object point to each direction of gaze under wearing conditions.

Moreover, it is proposed, especially by the Zeiss and Rodenstock companies under their respective references Zeiss Individual and Impression ILT, to consider, for the definition of progressive lenses, the actual position of the lens in front of the wearer's eye. To this end, measurements of the position of the lens in the frame chosen by the wearer are performed.

Applicant is also selling under the brand name VARILUX IPSEO a range of progressive lenses, which are defined by the wearer's head-eye behavior. This definition is based on the observation that any wearer, wishing to look at points at a given height in an object space, can move either his or her head or eyes and that a wearer's viewing strategy is based on a combination of movements of the head and eyes. The product VARILUX IPSEO therefore offers different lenses, for a given ametropia-addition combination, depending on the wearer's lateral viewing strategy.

Along the same lines of customizing progressive ophthalmic lenses to the specific needs of each wearer, applicant's French patent application for a "Method for determining a pair of progressive ophthalmic lenses" filed on Aug. 27, 2004 under number 04 09 144 proposes to take into account the offset of the wearer's new vision sagittal plane in the determination of the optical characteristics of progressive lenses.

The Rupp & Hubrach company has also proposed, under the name Ysis, to measure the inclination of the head during a near vision task to determine the choice between four progression lengths proposed.

Finally, it is proposed, in international application PCT/FR2009/000458 filed Apr. 17, 2009, to determine a lens by optimization taking into account the individual position of the center of rotation of the wearer's eye.

Attempts have therefore been made, in recent years, to customize progressive ophthalmic lenses to best meet the needs of each wearer.

There is however still a need for a lens that better satisfies the needs of each wearer. In particular, there is a constant search for a way to improve comfort and facilitate the adjustment of the wearer to ophthalmic lenses, in particular progressive ophthalmic lenses.

The invention therefore proposes to take into account height of the wearer or the height of the wearer's eyes in order to design ophthalmic lenses that are customized to the needs of the wearer. The wearer will consequently enjoy better visual comfort.

The present invention thus provides a method for determining an ophthalmic lens for a wearer comprising the steps of:
  i) determining a height or a height of the eyes of the wearer;
  ii) calculating at least one characteristic of the ophthalmic lens as a function of the height or height of the eyes of the wearer.

According to preferred embodiments, the method according to the invention comprises one or more of the following:
  the lens is a multifocal lens.
  the ophthalmic lens has a power addition and a fitting cross, and in which the lowering of the wearer's eyes from the fitting cross to reach a predetermined threshold value for power addition of the ophthalmic lens is an increasing function of height or height of the wearer's eyes.
  step ii) comprises the steps of:
    a) determining a reading distance for the wearer as a function of the height or height of the eyes of the wearer, and
    b) calculating at least one characteristic of the ophthalmic lens as a function of the reading distance.
  lateral offset in the nasal direction of a control point for a near vision region with respect to a control point for a distance vision region is determined according to a decreasing function of height or height of the eyes of the wearer.
  lateral offset in the nasal direction of a control point for a near vision region with respect to a control point for a distance vision region is determined according to an increasing function of the addition of the ophthalmic lens.
  power addition of the ophthalmic lens is determined according to a decreasing function of height or height of the eyes of the wearer.
  power addition of the ophthalmic lens is also determined according to an increasing function of the wearer's age.
  the ophthalmic lens is a lens of the unifocal type.
  a height for a center of aberrations for the ophthalmic lens is positioned on the ophthalmic lens as a function of the height of the wearer or height of the wearer's eyes.

In another aspect, the invention provides a method for optimizing an ophthalmic lens for a wearer of known prescription comprising the steps of:
  selecting at least one current surface of the ophthalmic lens;
  determining a target optical function for the ophthalmic lens according to the prescription for the wearer, by implementation of the above method for determining taken in all its combinations;
  determining optical targets from the target optical function, and
  determining at least one optimized surface by modulating the at least one current surface to achieve the optical targets.

The invention also provides a method for manufacturing an ophthalmic lens comprising the steps of:
  providing a starting ophthalmic lens;
  determining at least one surface optimized for the ophthalmic lens by means of the optimization method defined above, and
  machining of the lens to achieve the at least one optimized surface.

Finally the invention provides a set of semi-finished lenses for wearers of differing heights or heights of their eyes comprising lenses at least one characteristic of which is a function of height or height of the eyes of wearers.

Other features and advantages of the invention will become apparent on reading the following description of a preferred embodiment of the invention given by way of example and with reference to the accompanying drawings.

Figure 1:
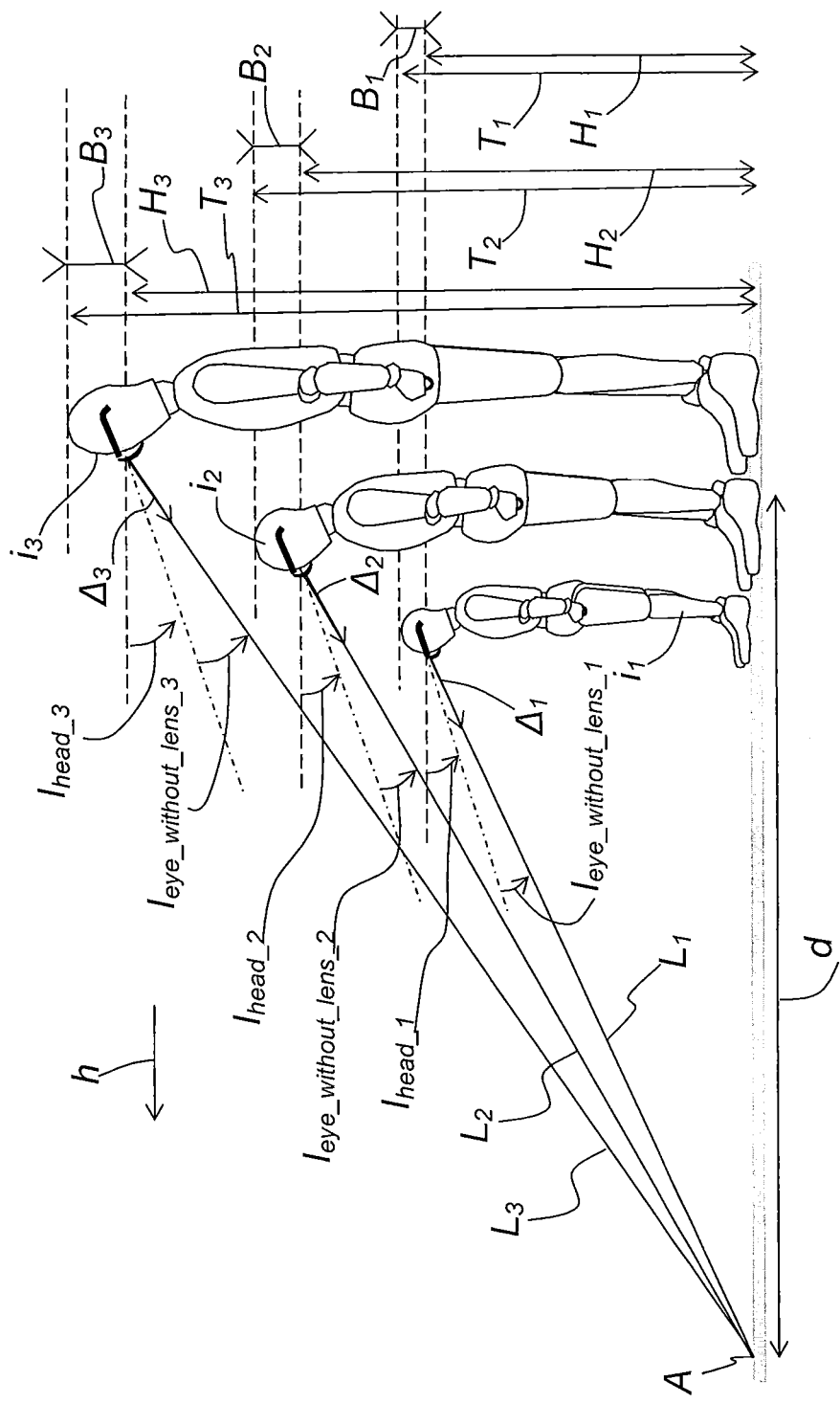
FIG. 1 shows schematically three ophthalmic lens wearers gazing at a given reference point.

According to the invention, a method for determining an ophthalmic lens for a wearer comprising the steps of:
  i) determining the height of the wearer or of the wearer's eyes;
  ii) calculating at least one characteristic of the ophthalmic lens as a function of the height of the wearer or the height of the wearer's eyes.

The characteristic of the ophthalmic lens that is a function of height of the wearer or the height of the wearer's eyes may in particular be the addition, the inset or the beginning of power progression of the lens, that is to say the point on the meridian of progression corresponding to a lowering of the wearer's eyes from the fitting cross to reach a predetermined threshold value, for example between 5 and 25% of the addition of the ophthalmic lens.

It should first be noted that height of a wearer or the height of his or her eyes are easily measurable quantities. The wearer usually knows his height so it can even be envisaged not to measure the height of the wearer.

Now, the wearer's height, or the height of his or her eyes for example determines the wearer's approach to the object space, notably the position and angles of the eyes and of the wearer's head in order to gaze at points.

Thus, taking into account height of the wearer or the height of his or her eyes to calculate at least one parameter of the ophthalmic lens makes it possible to best adapt the lens to the wearer by optimization. Furthermore, optionally measuring the height of the wearer or of his or her eyes makes optimization particularly easy to implement.

Moreover, height of the wearer and the height of his or her eyes are variables that are highly dependent on each other. In particular, the height of the wearer's eyes can be estimated as a function of the height of the wearer. To do this, we can estimate that the distance between the eyes and top of the head of the wearer is substantially the same for all wearers, or consider that this distance is a function, notably linear or affine, of height of the wearer. Of course, it is also possible, inversely, to determine height of the wearer depending on the height of the wearer's eyes.

Thus, depending on the desired adaptation of the ophthalmic lens, it is possible to take into account height of the wearer or a height of the eyes of the wearer in a similar fashion, given that one of these variables can be estimated from the other.

In practice, it appears easier to measure height of the wearer. It is even possible to ask the wearer simply his or her height. It is then possible to estimate the height of the wearer's eyes as described above.

It is also possible to directly measure the height of the wearer's eyes and, if necessary, to deduce from this measurement, height of the wearer.

The information on the wearer's height or height of the wearer's eyes is transmitted by the optician or optometrist to the ophthalmic lens manufacturer.

This information on height or height of the eyes can be a measured or estimated value as was indicated above. This allows optimum optimization of the lens.

However, it also simply be stated that the height or height of the eyes of the wearer is within a predefined range. This allows in particular optimization of ophthalmic lenses for a wearer who does not know his height and/or height of his eyes. Moreover, it is possible in this way to define semi-finished ophthalmic lenses optimized for the preset range. We can then define a set of semi-finished ophthalmic lenses each optimized for a predefined range.

The method of the invention can be applied to any type of lenses, especially progressive multifocal lenses and unifocal type lenses.

According to a first point, this method applies to determination of a multifocal ophthalmic lens, especially a progressive multifocal lens as defined above.

However, the determination method can also be implemented for a lens of the "unifocal" type.

A lens of the unifocal type should be taken to mean an ophthalmic lens associated with a specific prescription for a given viewing distance. The ophthalmic prescription for this viewing distance may include a power value, positive or negative, and a value for and an axis of astigmatism. This prescription is intended to compensate the wearer' visual defect by means of the lens. In the simplest case of unifocal lenses of the conventional type, the front and back faces of these lenses are spherical surfaces, or toric surfaces if the prescription covers astigmatism.

A lens of the unifocal type is fitted in the frame so that the principal direction of gaze of the wearer coincides with the optical center of the ophthalmic lens.

FIG. 1 shows schematically three wearers $i_1$, $i_2$, $i_3$ wearing multifocal ophthalmic lens spectacles, the three wearers being of respective differing heights $T_1$, $T_2$, $T_3$.

In the following, a physical quantity used without a subscript means that quantity in general, and used with a subscript means this same physical quantity when it relates to each specific wearer $i_1$, $i_2$, $i_3$. An equation given below that includes physical quantities without subscripts should be understood as applying to all three wearers $i_1$, $i_2$, $i_3$, considered as an example.

For each wearer $i_1$, $i_2$, $i_3$, we define the height H of the eyes, respectively denoted $H_1$, $H_2$, $H_3$, using the formula:

$$H = T - B, \qquad (1)$$

in which B represents, for each wearer, the distance between the eyes and the top of the head. Distance B can differ from one wearer to the next and is denoted respectively $B_1$, $B_2$, $B_3$.

FIG. 1 schematically illustrates the difference in head tilt $I_{head}$, denoted respectively $I_{head\_1}$, $I_{head\_2}$, $I_{head\_3}$, and eyes $I_{eye}$, denoted respectively $I_{eye\_1}$, $I_{eye\_2}$, $I_{eye\_3}$, for the three wearers $i_1$, $i_2$, $i_3$ to gaze at the same reference point A. The angle $I_{eye}$ corresponds to the angle of lowering of the wearer's eye.

In this case, reference point A is located at ground level, at a distance d from wearers $i_1$, $i_2$, $i_3$. Although different in FIG. 1, for reasons of readability of the drawing, the distance d is in fact identical for all wearers $i_1$, $i_2$, $i_3$.

Reference point A is thus located at a distance L, respectively denoted $L_1$, $L_2$, $L_3$, from the eyes of wearers $i_1$, $i_2$, $i_3$, which is different from one wearer to another. In effect, the distance L satisfies the following equation:

$$L = \sqrt{d^2 + H^2} \qquad (2)$$

Each of the wearers $i_1$, $i_2$, $i_3$, is gazing at reference point A at an angle, measured from the horizontal h, equal to $I_{head} + I_{eye}$. The angle $I_{head+Ieye}$ corresponds to the angle between the direction of gaze $\Delta_1$, $\Delta_2$, $\Delta_3$, of wearer $i_1$, $i_2$, $i_3$ gazing at the reference point A, relative to the horizontal direction h, which corresponds to wearers $i_1$, $i_2$, $i_3$ gazing into infinity.

Below, we consider that the three wearers have the same vertical eye-head behavior.

Vertical eye-head behavior is the propensity of the wearer to move the head or move the eyes vertically to a greater or lesser extent in order to gaze at a target point. This behavior is typically measured by a gain C. This gain C is defined as the ratio between the angular deviation of the head $I_{head}$ relative to the total angular deviation needed to gaze at the target point. The total angular deviation needed to gaze at the target point is the sum of the angular deviation of the head $I_{head}$ and the angular deviation of the eyes of the wearer $I_{eye}$ to gaze at the target point.

In other words, the gain C is defined by the formula:

$$C = \frac{I_{head}}{I_{head} + I_{eye}} \qquad (3)$$

Of course, other definitions of gain and eye-head behavior are possible.

Initially, we shall not take account of prismatic effects induced by ophthalmic lenses worn by wearers $i_1$, $i_2$, $i_3$. In other words, we assume that the light ray coming from reference point A and seen by the wearer follows a rectilinear path.

In this case, from the above formulae we deduce that the value of lowering the eyes $I_{eye}$, which is denoted $I_{eye\_without\_lens}$, is given for each wearer $i_1$, $i_2$, $i_3$, by the equation:

$$I_{eye\_without\_lens} = (1 - C) \times \text{Arctan}\left(\frac{(T-B)}{d}\right) \quad (4)$$

Similarly, for each wearer, we define the proximity of the point P to reference point A as the inverse of the distance L:

$$P = \frac{1}{L} \quad (5)$$

It is assumed that remaining subjective accommodation is zero. Subjective accommodation is made up partly by the remaining objective accommodation, which corresponds to the lens of the eye's ability to focus, and partly by the depth of field.

Therefore, the proximity P is equal to the power $P_{lens}$ to be added to the power for distance vision for wearer $i_1$, $i_2$, $i_3$ to see reference point A sharply. This gives:

$$P_{lens} = \frac{1}{\sqrt{d^2 + (T-B)^2}} \quad (6)$$

Table I below shows examples of values of the lowering of the eyes $I_{eye\_without\_lens}$ for three wearers, the values having been calculated using this formula (4), and the corresponding lens power, calculated using formula (6).

In this table I, the wearers have heights $T_1$, $T_2$, $T_3$ of 1.50 m, 1.67 m and 2 m, respectively. To simplify the calculations, it is assumed in this table that the values $B_1$, $B_2$, $B_3$ are the same for each one of the wearers $i_1$, $i_2$, $i_3$. We set $B_1 = B_2 = B_3 = 13$ cm.

The distance d between the wearers $i_1$, $i_2$, $i_3$, and the reference point A is chosen equal to 1.25 m. Reference point A on the ground thus corresponds to the point gazed at by a wearer when walking.

Furthermore, for the calculations, gain C is chosen equal to 0.67. This gain value C corresponds to a behavior on the part of the wearer, in which head movement is about twice as much as eye movement in order for the wearer to gaze at a target point. In other words, a gain equal to 0.67 C corresponds to an angle $I_{head}$ that is about twice as much as the angle $I_{eye}$.

Finally, for this first calculation, we consider a lens that has zero sphere and an addition of 2.50 diopters.

As shown in Table I, the taller the wearer is, the more he must change eye inclination relative to the horizontal, to gaze at the same reference point A.

Specifically, under the conditions described above, a wearer who is 2.00 m tall looks down at an angle of 17.43° from the horizontal to gaze at reference point A. A wearer who is 1.5 m tall changes eye inclination by 14.8° or about 2.5° less than the wearer who is 2.00 m tall.

TABLE I

Eye inclination according to the wearer's height

| wearer | T (m) | H (m) | L (m) | P (diopter) | Sphere (diopter) | Addition (diopter) | $P_{lens}$ (diopter) | $I_{eye\_without\_lens}$ (degrees) |
|---|---|---|---|---|---|---|---|---|
| $i_1$ | 1.50 | 1.37 | 1.85 | 0.54 | 0.00 | 2.50 | 0.54 | 14.8 |
| $i_2$ | 1.67 | 1.54 | 1.98 | 0.50 | 0.00 | 2.50 | 0.50 | 16.0 |
| $i_3$ | 2.00 | 1.87 | 2.25 | 0.44 | 0.00 | 2.50 | 0.44 | 17.4 |

This first calculation is nevertheless theoretical, or at least actually concerns wearers without glasses. Indeed, as indicated above, in this first calculation, the prismatic effects of ophthalmic lenses have not been taken into account.

Now, every ophthalmic lens induces prismatic effects, which depend in particular on the power of the ophthalmic lens and the material it is made from.

Where one does take into account prismatic effects, the light beam between point A and the wearer's eye gets refracted by the lens. Thus, the point where the light beam from reference point A impacts the lens is different from the point of to intersection of the line connecting the eye to reference point A. The lowering of the eye is also different if one takes into account prismatic effects induced by the lens, as a result of refraction experienced by the beam from reference point A.

In the case where prismatic effects of the ophthalmic lens are taken into account, we call the angle through which the eye is lowered $I_{eye\_with\_lens}$.

The light beam therefore makes an angle slightly different from $I_{head} + I_{eye\_without\_lens}$ with the horizontal.

Tables II, III and IV below give the values of the angle $I_{eye\_with\_lens}$ for all three wearers $i_1$, $i_2$, $i_3$ corresponding to the values of the angle $I_{eye\_without\_lens}$ of Table II and for three different shapes of ophthalmic lens. In the case of Table II, the lens has zero sphere. Table III corresponds to a lens prescription equal to −6 diopters and Table IV to a lens prescription equal to 6 diopters. The angle $I_{eye\_with\_lens}$ can be determined by ray tracing.

TABLE II

Eye inclination according to the wearer's height in the case of a lens with zero sphere

| wearer | P (diopters) | Sphere (diopters) | Add. (diopters) | $P_{lens}$ (diopters) | $I_{eye\_without\_lens}$ (degrees) | $I_{eye\_with\_lens}$ (degrees) |
|---|---|---|---|---|---|---|
| $i_1$ | 0.54 | 0.00 | 2.50 | 0.54 | 14.8 | 10.1 |
| $i_2$ | 0.50 | 0.00 | 2.50 | 0.50 | 16.0 | 11.6 |
| $i_3$ | 0.44 | 0.00 | 2.50 | 0.44 | 17.4 | 14.4 |

TABLE III

Eye inclination according to the wearer's height for a lens with a −6 diopter prescription at the distance vision point

| wearer | P (diopters) | Sphere (diopters) | Addition (diopters) | $P_{lens}$ (diopters) | $I_{eye\_without\_lens}$ (degrees) | $I_{eye\_with\_lens}$ (degrees) |
|---|---|---|---|---|---|---|
| $i_1$ | 0.54 | −6.00 | 2.50 | 0.54 | 14.8 | 8.7 |
| $i_2$ | 0.50 | −6.00 | 2.50 | 0.50 | 16.0 | 9.9 |
| $i_3$ | 0.44 | −6.00 | 2.50 | 0.44 | 17.4 | 12.2 |

TABLE IV

Eye inclination according to the wearer's height for a lens with a +6 diopter prescription at the distance vision point

| wearer | P (diopters) | Sphere (diopters) | Addition (diopters) | $P_{lens}$ (diopters) | $I_{eye\_without\_lens}$ (degrees) | $I_{eye\_with\_lens}$ (degrees) |
|---|---|---|---|---|---|---|
| $i_1$ | 0.54 | 6.00 | 2.50 | 0.54 | 14.8 | 14.1 |
| $i_2$ | 0.50 | 6.00 | 2.50 | 0.50 | 16.0 | 16.1 |
| $i_3$ | 0.44 | 6.00 | 2.50 | 0.44 | 17.4 | 20.4 |

Tables II, III and IV show that, whatever the shape of the ophthalmic lens, that is to say, whatever the sphere value thereof, the angle $I_{eye\_with\_lens}$ gets bigger the taller the wearer. In other words, to gaze at a point on the ground which is at the same distance d from the wearer, a distance measured horizontally in FIG. 1, a wearer lowers his eyes to an increasing extent the taller he is. In addition, the power of the lens necessary to look at the point in question also varies depending on the height of the wearer's eyes.

Conversely, these results can also be interpreted as follows: the taller the wearer is, the more a point located at a predetermined distance from the wearer at which the wearer is gazing will correspond to a lower point of intersection of the wearer's gaze with the ophthalmic lens.

To date, these findings were not taken account of in the definition of ophthalmic lenses. This results in some discomfort for the wearer. Indeed, the wearer is forced to change vertical eye-head behavior in order to gaze at a point such that the intersection of the gaze with the surface of the lens corresponds to a point on the ophthalmic lens of appropriate power.

Therefore, according to an example of the method for definition of ophthalmic lenses, the ophthalmic lenses are adapted to height or a height of the eyes of the wearer so that the power progression of the progressive ophthalmic lens begins increasingly lower down on the lens with respect to the mounting cross the taller the wearer is or, respectively, the height of the eyes is greater.

In other words, the taller the wearer the lower down on the ophthalmic lens with respect to the fitting cross, power progression starts.

Figure 2:
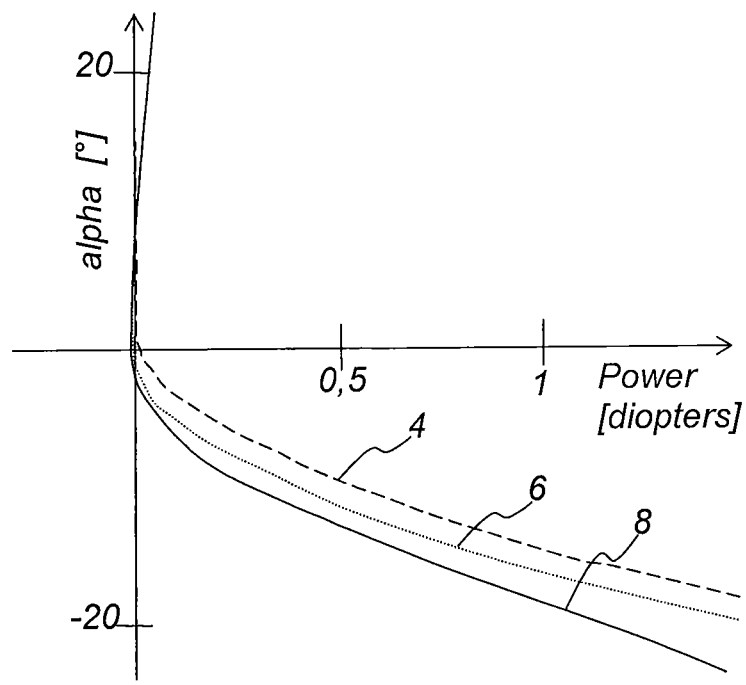
FIG. 2 shows the evolution of power progression of an ophthalmic lens defined according to an example of the method for defining a lens for wearers of three different heights.

FIG. 2 shows examples of changes in the power of ophthalmic lenses adapted to three wearers $i_1$, $i_2$, $i_3$, along the meridian of progression. Specifically, the position of a point on the ophthalmic lens, along the meridian, is represented here by the angle alpha the wearer's gaze direction makes when passing through this point on the lens, compared to a reference direction of gaze passing through the fitting cross of the lens.

Curves 4, 6, 8 correspond to wearers $i_1$, $i_2$, $i_3$. Consistent with what has been described above, curve 4, for wearer $i_1$ 1.50 m tall, is located above curve 6 for the wearer $i_2$ who is 1.67 m tall, which itself lies above the curve 8 for wearer $i_3$ who is 2.00 m tall.

As explained above, we now make it possible for users to avoid having to change their eye-head behavior as would be necessary if the ophthalmic lens had not been determined taking into account height or height of the wearer's eyes.

According to another example of the method for definition of ophthalmic lenses, it is proposed to determine the lateral offset in the nasal direction of a control point for a near vision region with respect to a control point for a distance vision region as a decreasing function of height or height of the wearer's eyes.

This lateral offset in the nasal direction is known in English as the "inset".

It is known that the Harmon distance is the distance involving the least expenditure of energy in near vision work. In other words, it is when working at this distance that the visual system involves the least effort. The Harmon distance is consequently considered as the working distance for near vision that is most comfortable. It is therefore useful to consider the Harmon distance as the reading distance for the definition of ophthalmic lenses.

The reading distance is conventionally used in the definition of an ophthalmic lens to determine the value of the addition necessary for the ophthalmic lens. Indeed, to measure the addition, one places an object at the reading distance for the wearer and one determines the addition for the ophthalmic lens needed so that the wearer can see the object clearly.

Harmon distance is defined as the distance between the elbow and the upper end of the knuckle on the middle finger. Harmon distance is measured usually between the end of the elbow and the point of grip formed by the thumb and forefinger.

Figure 3:
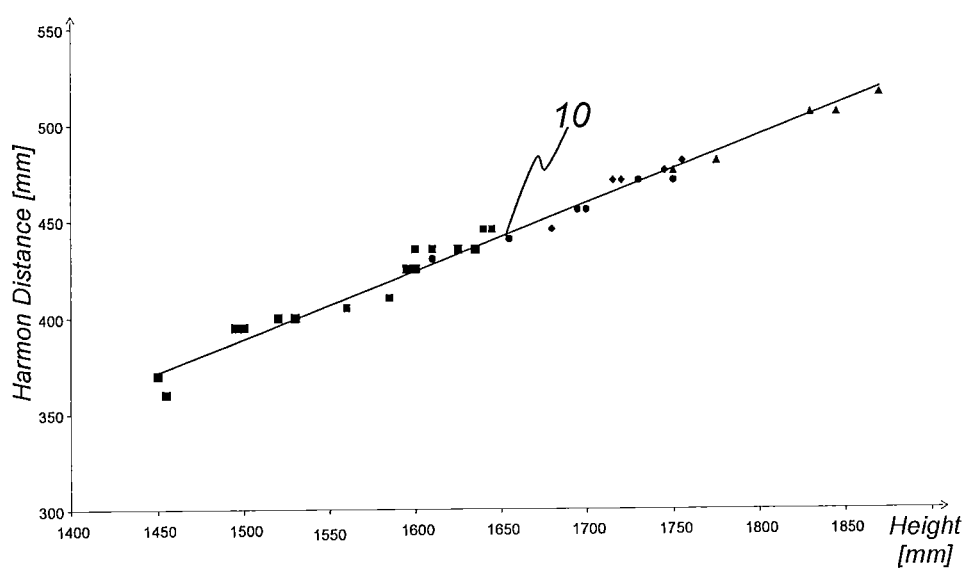
FIG. 3 shows the results of an anthropometric study for determining the Harmon distance depending on height of individuals.

FIG. 3 shows the results of an anthropometric study for determining the Harmon distance, indicated on the y-axis, as a function of the height of individuals, indicated on the x-axis. Harmon distance and height of individuals are given in millimeters in FIG. 3. It should be noted that in general, anthropometric data depend on the date of the study, the ethnicity of the sample of individuals and the age of the individuals.

As indicated by the straight line 10 shown in FIG. 3, there is a statistical link between the height of individuals and Harmon distance for these individuals. Line 10 is obtained by linear regression.

Other anthropometric work has led to estimation of an equation for the line relating Harmon distance to wearer height taking the form $$y = Q \times T + R \quad (7)$$

where:

y is the Harmon distance, in millimeters;

T is height of the individual, in millimeters;

Q and R are constants determined by linear regression, the constant R being in millimeters.

It has been determined that the constant Q is 0.3 and the constant R is equal to −104 mm.

As discussed above, assuming that reading distance is the Harmon distance, it is then possible to determine the inset for the lens. Indeed, it is known that the inset of a multifocal ophthalmic lens depends, among other things, on reading distance. This is because, depending on the distance determined for reading, the wearer's gaze, when reading, corresponds to a greater or lesser degree of rotation of the eyes in the direction of the sagittal plane. For identical lenses, the smaller the reading distance for the wearer, the greater the inset of the lens should be.

Figure 4:
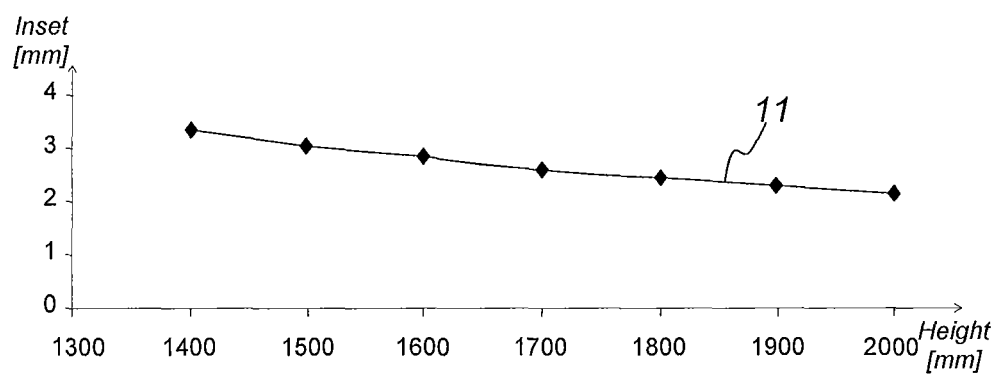
FIG. 4 shows variation in inset of ophthalmic lenses defined according to an example of the method for lens definition.

FIG. 4 illustrates a curve 11 defining inset of an ophthalmic lens as a function of the height of the wearer, the wearer being prescribed an addition of 2 diopters. This curve 11 shows that an ophthalmic lens suited to a wearer who is 1.4 m tall has an inset of 3.4 mm, while an ophthalmic lens suited to a wearer who is 2.00 m tall has an inset of 2.1 mm.

The change in the inset of the ophthalmic lens can take account of the reading distance for each wearer, this reading distance being related to the height of the wearer. Without this adaptation of inset as a function of the height of the wearer, that is to say, with a fixed inset for each and every height, ophthalmic lenses do not have optimum comfort for the wearer. Indeed, in this case, the meridian of progression is badly situated in relation to the wearer's gaze.

In another example of the method for definition of ophthalmic lenses, it is proposed to adapt the straight line defining reading distance according to the wearer's height to the age of the wearer.

In effect, it has been observed that elderly people, who have a higher power addition, work comfortably at a distance which is less than the Harmon distance. In contrast, for younger wearers, who have a smaller power addition, the comfortable reading distance is equal to the Harmon distance.

To take this difference according to the age of the wearer into account, and therefore the addition prescribed, over the reading distance, it is proposed, according to an example of the method for defining an ophthalmic lens to vary the value R according to the addition. This value of R can thus be constant if the addition is less than a threshold value. If the addition is greater than or equal to this threshold value, the value of R can be defined by an affine function of the addition.

In particular it is proposed to determine the reading distance DL in the form:

$$DL = Q \times T + R \quad (8)$$

in which $$\begin{cases} Q = \text{constant} \\ R = -104 & \text{if addition is less than 1.75 diopters,} \\ R = -80 * \text{addition} + 26 & \text{if addition is greater than or equal to 1.75 diopters.} \end{cases}$$

Figure 5:
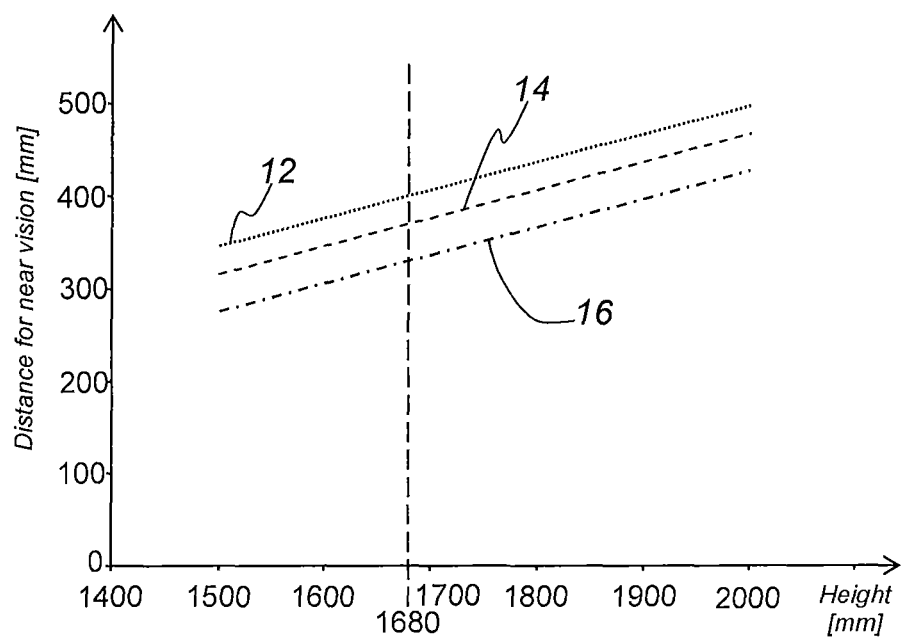
FIG. 5 shows three laws relating distance for near vision as a function of the height of the wearer and the power addition of lenses prescribed for the wearers.

FIG. 5 shows a set of three curves 12, 14, 16 which each correspond to a separate addition value. In this case the lines 12, 14 and 16 correspond respectively to an addition of less than 1.75, in this case 1.50, and an addition of 2.00 and 2.50 diopters. These lines are consequently represented by the equations:

for line 12: $DL = 0.30 \times T - 104$ (10a)

for line 14: $DL = 0.30 \times T - 134$ (10b)

for line 16: $DL = 0.30 \times T - 174$ (10c)

where the reading distance DL and height T are in millimeters.

This gives, for a given height, e.g. 1680 mm, three distinct values of the distance for near vision:

If the addition is less than 1.75 diopters, then the near vision distance is equal to 400 mm;

If the addition is equal to 2.00 diopters, then the near vision distance is equal to 370 mm, and If the addition is equal to 2.50 diopters, then the near vision distance is equal to 330 mm.

According to a fourth example of the method for definition of an ophthalmic lens, we determine a nominal inset, InSetn, calculated for an average height of 1680 mm. The value of the inset depending on height can then be estimated by an equation of the form:

$$\text{Inset} = (1+k) \times \text{Inset}n \quad (11)$$

where k is a variable that depends on height.

The variable k can for example take the following form:

$$k = 56 \times T^2 - 265.5 \times T + 288 \quad (12)$$

where height T is in meters.

According to another example of the method for definition of an ophthalmic lens, it is proposed to modulate the power for near vision as a function of the height of the wearer. Specifically, the taller the wearer, the lesser the power for near vision.

Indeed, conventionally, the optician, ophthalmologist or optometrist makes a prescription by providing prescription parameters. These parameters include the prescription for sphere, cylinder, axis and the prescribed addition. It is proposed that in addition, the measurement distance for addition DM and height of the wearer be given.

In this case, in a first step we determine the reading distance DL as a function of the height of the wearer, for example using the formula (8). Thus, addition can also be taken into account, similarly to the example discussed with reference to FIG. 5.

In a second step, it is determined whether the distance for measuring the addition DM is different from the reading distance DL obtained from the first step.

In the latter case, we adjust the addition of the ophthalmic lens which we call Add_lens:

$$\text{subjective\_accomodation} = \frac{1}{DM} - \text{Add\_prescribed} \quad (14)$$

Now:

$$\text{Add\_lens} = \frac{1}{DL} - \text{subjective\_accomodation} \quad (15)$$

from whence:

$$\text{Add\_lens} = \frac{1}{DL} - \frac{1}{DM} + \text{Add\_prescribed} \quad (16)$$

This adjustment of the addition of the lens relative to the prescribed addition makes it possible to correct the fact that the determination of the prescribed addition was carried out at a reading distance different from the actual reading distance for the wearer as determined in the second stage.

Without this adjustment of the addition for the lens, the wearer would have to change reading distance, to make it equal to the distance for which the addition prescribed was done. This would result in discomfort to the wearer of the ophthalmic lens.

Table V below illustrates the adaptation of the addition for the lens as a function of the height of the wearer.

TABLE V

Examples of adaptation of lens addition to the height of the wearer

| | Height [m] | | | | | | |
|---|---|---|---|---|---|---|---|
| | 1.40 | 1.50 | 1.60 | 1.70 | 1.80 | 1.90 | 2.00 |
| Reading distance [m] | 0.32 | 0.35 | 0.38 | 0.41 | 0.44 | 0.47 | 0.50 |
| Addition measurement distance [m] | 0.4 | 0.4 | 0.4 | 0.4 | 0.4 | 0.4 | 0.4 |
| Prescribed addition [diopters] | 2 | 2 | 2 | 2 | 2 | 2 | 2 |
| Addition for the lens [diopters] | 2.7 | 2.4 | 2.2 | 2.0 | 1.8 | 1.6 | 1.5 |

Note that in this table, reading distance was determined using the equation:

$$DL = 30 \times T - 10.4 \quad (17)$$

where:
DL is the reading distance in meters, and
T is height in meters.

As shown in this Table V, the taller the wearer, the lower the power for near vision in order to offset the difference between the measurement distance for near vision and actual reading distance.

Note that the above example concerns an ophthalmic lens with power progression.

It is nevertheless possible to implement this power adjustment based on the height of the wearer to an ophthalmic lens of the unifocal type. In particular, it is useful to adapt the power of ophthalmic lenses for reading glasses as described above.

Furthermore, it is possible to combine the examples discussed above.

In a first example, we combine the methods for defining ophthalmic lenses to take into account the height of the wearer to know where to start power progression of the ophthalmic lens and to determine inset. In this first example, for a prescription for an addition of 2.5 diopters, it is determined that the inset is equal to respectively 3.10 mm, and 2.17 mm, for wearers respectively 1.50 m, and 2.00 m tall.

In another example of the method for determining, height was taken into account to adapt the beginning of power progression, the value of the addition for the lens and inset for a prescription of power addition equal to 2.5 diopters determined for a reading distance for 40 cm. The value of the addition for the lens determined according to this second example for a wearer 1.50 m tall is 2.85 diopters, while the lens for the wearer 2.00 m tall as an addition of 2 diopters. Finally, it is determined that the lens for a wearer 1.5 m tall has an inset equal to 3.13 mm, while the lens for a wearer 2.00 m tall has an inset of 2.14 mm.

Here, it can be clearly seen that, because height is taken into account in determining both the beginning of power progression, inset and addition, the inset thus obtained is different from the inset obtained if we were not to take account of height when determining ophthalmic lens addition.

Figure 6:
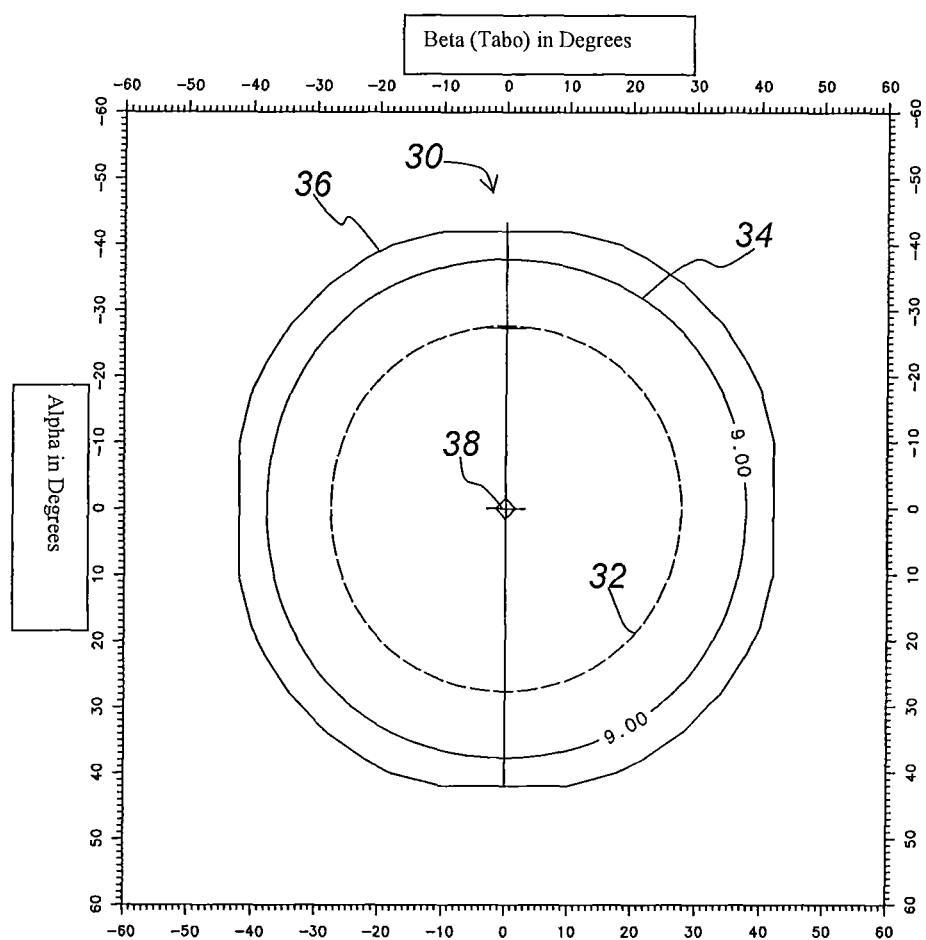
FIG. 6 shows schematically curves for iso-power for a known type of unifocal lens.
Figure 7:
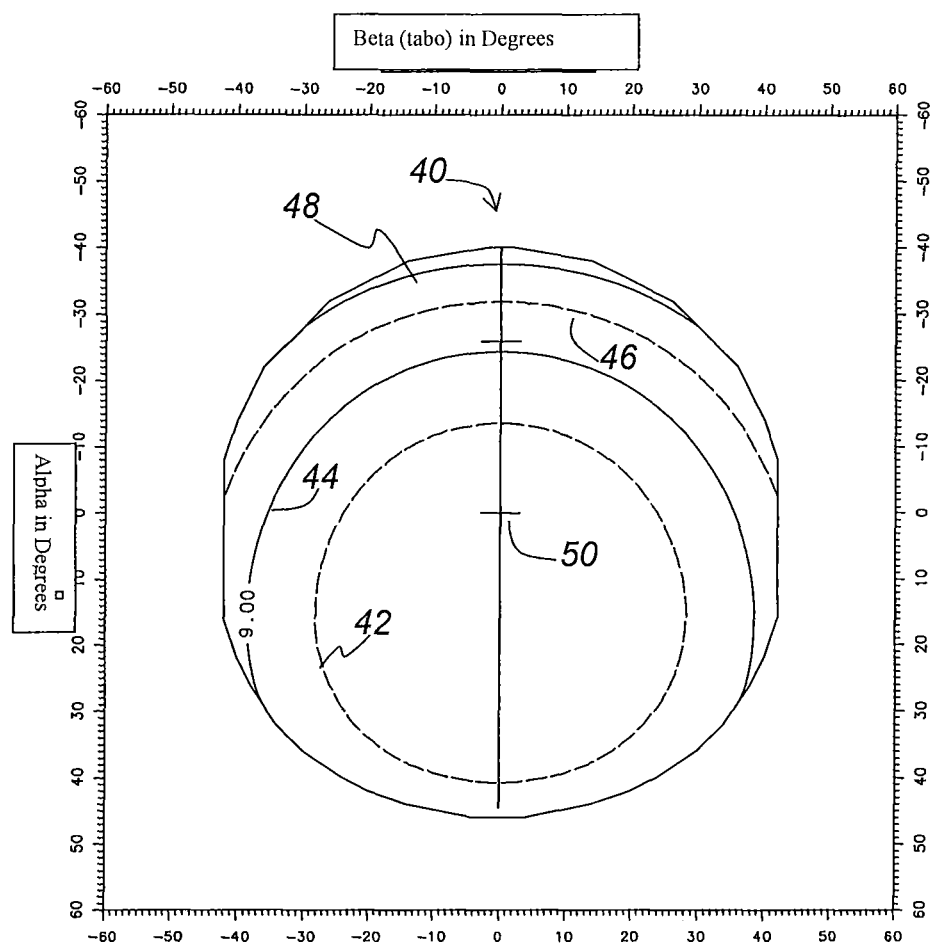
FIG. 7 shows schematically curves for iso-power of a unifocal type lens defined according to an example of the method for definition.

FIGS. 6 and 7 illustrate an implementation of another example of the method for adapting a characteristic of an ophthalmic lens based on height or the height of the wearer's eyes for this ophthalmic lens.

Ophthalmic lenses 30, 40 for which analysis of optical power is shown in FIGS. 6 and 7 are ophthalmic lenses of the "unifocal" type. In this case, such lenses have slight variations in power, illustrated in the figures by the curves showing iso-power 32, 34, 36 and 42, 44, 46, 48 respectively.

The ophthalmic lens 30 of FIG. 6 is a conventional unifocal type ophthalmic lens. Indeed, the ophthalmic lens 30 exhibits curves for iso-power 32, 34, 36 which are substantially concentric, centered on the optical center 38 of ophthalmic lens 30. The lens is mounted so that the optical center is aligned with the wearer's pupil. The lines of iso-power 32, 34, 36 successively correspond to a variation in power of 0.25 diopters.

The ophthalmic lens 40 of FIG. 7, defined by a method for defining of ophthalmic lenses as a function of the height of the wearer, also exhibits lines of iso-power 42, 44, 46, 48 which are concentric. However, in the case of the lens 40, the center of these lines of iso-power is offset from the optical center 50 of the lens. Specifically, the lens 40 being for a tall wearer, for example, 2.00 m tall, the center of the lines of iso-power is offset vertically downwards relative to optical center 50. In doing so, the height of the center for ophthalmic lens aberrations, which corresponds to the center of the lines of iso-power, is positioned lower on ophthalmic lens 40 than on ophthalmic lens 30.

Indeed, a tall wearer, for example 2.00 m tall, tends to look down more than a wearer of small stature, for example 1.50 m tall for the same eye-head behavior on the part of both wearers. By moving the center of the lines of iso-power vertically downward, it is ensured that a tall wearer looks most of the time through the region of optimal correction defined by the curve 42 in FIG. 7. This region of optimal correction corresponds to the set of points for the ophthalmic lens having a power that differs from the prescribed power by less than 0.25 diopters.

Of course, the present invention is not limited solely to the examples discussed above.

Firstly, height, or a height of the eyes of the wearer, is a parameter that can be taken into account in combination with other parameters for the determination of ophthalmic lenses.

Moreover, only methods for determining a lens have been described above. However, these methods for determination can be implemented as part of a process for optimization of an ophthalmic lens for a wearer having a known prescription.

Such an optimization process can be the one described in EP 0 990939 or EP 1920291, in which the target lens is defined as a function of the height of the wearer or of the wearer's eyes.

In other words, such a process for optimizing ophthalmic lens implementing a method for defining an ophthalmic lens according to height or height of the wearer's eyes may comprise a first step of determining starting equations for the front and rear surfaces of the lens. The refractive index of the lens can also be determined. These determinations can be performed by reading data from the manufacturer of the ophthalmic lens or by measurement.

Then, at least one current surface of the ophthalmic lens is selected. This at least one current surface can be chosen identical to the at least one initial surface of the corresponding lens. However, it is known to the skilled person that at least one current surface can also be chosen differently to the at least one initial surface of the corresponding lens. Current surfaces correspond to a rear face of the ophthalmic lens, oriented towards the wearer, and/or a front face of the ophthalmic lens, directed away from the wearer.

The next step of the optimization process according to this example then comprises determining a target optical function for the ophthalmic lens according to the prescription for the wearer. The target optical function usually takes the form of equations and/or distributions of power and astigmatism over the optimized ophthalmic lens, depending on the direction of gaze of the wearer. The target optical function can thus, for example, associate with each direction of gaze a power/astigmatism pair or an equation relating these two parameters.

This target optical function is determined using the method for determining an ophthalmic lens as described above. Thus, this target optical function is determined taking into account the wearer's height or the height of the wearer's eyes. Of course, in this optimization process, the parameter "wearer's height" or "height of the eyes of the wearer" can be combined with any other known parameter for optimization, in particular the conditions under which the ophthalmic lenses will be worn. The target optical function may in particular depend on the refractive index of the lens.

Starting from the optical function, optical targets are defined. These optical targets correspond to a set of optical data for the optical function, determined for certain directions of gaze. Conventionally, optical targets are a set of values, ideal for the particular wearer, for power-astigmatism for several different directions of gaze. The optical targets can thus be obtained by sampling the target optical function.

The optimization process then continues with a step of determining at least one optimized surface by modulating the current surface in order to achieve the optical targets. This step is iterative. It consists in from time to time modifying the current surface or surfaces and then determining, by simulation, if this modification performed from time to time does make it possible or not to come closer to the optical targets determined previously. This step is consequently generally performed by computer. Simulation depends, among other things, on the refractive index of the lens.

This optimization process can be implemented in a method for producing an ophthalmic lens. The method of producing an ophthalmic lens then includes a first step of supplying a starting ophthalmic lens. It is possible to provide a semi-finished lens as the starting lens. A semi-finished ophthalmic lens is a lens only one surface of which is to be machined, in other words also that there is, a priori, only one single surface to be optimized.

The method for producing comprises a step of determining at least one optimized surface for an ophthalmic lens by means of the optimization method, followed by a step of machining the lens in order to obtain the at least one optimized surface. In such a case, it is frequent that the refractive index of the lens employed in the optimization procedure is identical to that of the lens itself.

As indicated above, it is possible to optimize one or both surfaces of lenses, depending on the case. Similarly, the production method can be implemented by machining one or both surfaces of the ophthalmic lens initially supplied.

Lens machining to obtain the optimized surface or surfaces can notably be performed by a so-called digital surfacing process.

Additionally, the invention relates to a set of semi-finished lenses, in other words intended only to be machined on one's face, which are intended for wearers of differing heights or differing heights of their eyes. Such a set of semi-finished lenses includes lenses of which at least one characteristic depends on the height of the wearer or the height of the eyes of the wearer.

Thus, such a set can for example comprise batches of semi-finished ophthalmic lenses. Each batch includes lenses having different bases and power additions. Base is the value for sphere at a reference point, generally the control point for distance vision. The front face, in other words the face designed to be directed away from the wearer, can be defined for a range of differing heights, in other words that the point where progressions starts, addition and/or inset are notably determined depending on the height of the wearer or the height of the wearer's eyes.

One can for example suppose there are three batches of semi-finished lenses respectively for wearers of small stature, of average height and tall wearers. For a given prescriptions, one can choose the semi-finished lens that corresponds to the wearer's height. In this case, the rear face is calculated to correspond to the prescription for the wearer.

The invention claimed is:

1. A method for determining an ophthalmic lens for a wearer comprising:
   determining a height of the wearer;
   calculating at least one characteristic of the ophthalmic lens based on the height of the wearer, the at least one characteristic including a value of lowering the eyes for the wearer from a fitting cross to reach a predetermined threshold value for a power addition, the value of lowering the eyes being an increasing function of the height of the wearer.

2. The method for determining the ophthalmic lens for the wearer according to claim 1, wherein the ophthalmic lens is a multifocal lens.

3. The method for determining the ophthalmic lens for the wearer according to claim 1, wherein the at least one characteristic further includes a reading distance for the wearer, the reading distance being a function of the height of the wearer.

4. The method for determining the ophthalmic lens for the wearer according to claim 1, wherein the at least one characteristic further includes an inset such that the inset of a control point for a near vision region with respect to a control point for a distance vision region is determined according to a decreasing function of the height of the wearer.

5. The method for determining the ophthalmic lens for the wearer according to claim 4, wherein the inset is further determined according to an increasing function of an addition of the ophthalmic lens.

6. The method for determining the ophthalmic lens for the wearer according to claim 1, wherein the at least one characteristic further includes a power addition of the ophthalmic lens, the power addition being determined according to a decreasing function of the height of the wearer.

7. The method for determining the ophthalmic lens for the wearer according to claim 1, wherein the at least one characteristic further includes a power addition of the ophthalmic lens, the power addition being determined according to an increasing function of an age of the wearer.

8. The method for determining the ophthalmic lens for the wearer according to claim 1, wherein the ophthalmic lens is a lens of the unifocal type.

9. The method for determining the ophthalmic lens for the wearer according to claim 1, wherein the at least one characteristic further includes a height for a center of aberrations for the ophthalmic lens, the height for the center of aberrations being positioned on the ophthalmic lens as a function of the height of the wearer.

10. A method for manufacturing an ophthalmic lens comprising:
providing a starting ophthalmic lens;
determining at least one surface optimized for the ophthalmic lens based on a height of a wearer, the at least one optimized surface being determined based on a value of lowering the eyes for the wearer from a fitting cross to reach a predetermined threshold value for a power addition, the value of lowering the eyes being an increasing function of the height of the wearer; and
machining the ophthalmic lens to achieve the at least one optimized surface.

11. The method for determining an ophthalmic lens for a wearer according to claim 1, wherein the height of the wearer is determined based on a height of the eyes of the wearer.

12. A method comprising:
obtaining one or more parameters of an ophthalmic lens for a wearer, at least one of the one or more parameters being based on a height of the wearer, the at least one parameter including a value of lowering the eyes for the wearer from a fitting cross to reach a predetermined threshold value for a power addition, the value of lowering the eyes being an increasing function of the height of the wearer;
defining optical targets from a target optical function according to the one or more parameters; and
modulating at least one current surface of the ophthalmic lens using a computer to achieve the optical targets, the modulating operation optimizing at least one surface of the ophthalmic lens.

13. The method according to claim 12, wherein the at least one parameter further includes a reading distance for the wearer, the reading distance being a function of the height of the wearer.

14. The method according to claim 12, wherein the at least one parameter further includes an inset such that the inset of a control point for a near vision region with respect to a control point for a distance vision region is determined according to a decreasing function of the height of the wearer.

15. The method according to claim 12, wherein the at least one parameter further includes an inset determined according to an increasing function of an addition of the ophthalmic lens.

16. The method according to claim 12, wherein the at least one parameter further includes a power addition of the ophthalmic lens, the power addition being determined according to a decreasing function of the height of the wearer.

17. The method according to claim 12, wherein the at least one parameter further includes a power addition of the ophthalmic lens, the power addition being determined according to an increasing function of an age of the wearer.

18. The method according to claim 12 wherein the at least one parameter further includes a height for a center of aberrations for the ophthalmic lens, the height for the center of aberrations being positioned on the ophthalmic lens as a function of the height of the wearer.

* * * * *